US008381277B2

(12) United States Patent
Bari

(10) Patent No.: US 8,381,277 B2
(45) Date of Patent: Feb. 19, 2013

(54) HOME NETWORKING USING LTE RADIO

(75) Inventor: Farooq Bari, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/368,165

(22) Filed: Feb. 7, 2012

(65) Prior Publication Data

US 2012/0135712 A1 May 31, 2012

Related U.S. Application Data

(62) Division of application No. 12/357,043, filed on Jan. 21, 2009, now Pat. No. 8,132,256.

(51) Int. Cl.
*G06F 15/16* (2006.01)
(52) U.S. Cl. ............................................ 726/6
(58) Field of Classification Search ........................ None
See application file for complete search history.

(56) References Cited

U.S. PATENT DOCUMENTS

| 2007/0206507 A1* | 9/2007 | Reichman et al. | 370/252 |
| 2009/0131018 A1* | 5/2009 | Osborn | 455/411 |
| 2010/0167694 A1* | 7/2010 | Chiussi et al. | 455/411 |
| 2010/0260068 A1* | 10/2010 | Bhatt et al. | 370/254 |
| 2011/0256850 A1* | 10/2011 | Selander et al. | 455/411 |

OTHER PUBLICATIONS

OA dated Jun. 23, 2011 for U.S. Appl. No. 12/357,043, 15 pages.

* cited by examiner

*Primary Examiner* — Brandon Hoffman
(74) *Attorney, Agent, or Firm* — Turocy & Watson, LLP

(57) ABSTRACT

A system and methodology that facilitates management of a single identity and billing relationship for multiple UE (user equipment) associated with a subscriber is provided. Specifically, each of the multiple UEs can employ LTE (Long Term Evolution) radio technology to authenticate and register with a femto access point. Further, the transport level billing associated with the multiple UE can be facilitated by the femto access point by employing a femto id (identity) and/or credentials. Moreover, the femto access point can be employed by the multiple UEs as a network hub and can be employed by the UEs to perform authentication to connect to a core network. In addition, the femto access point can determine an authorized IP cloud associated with a registered UE and allow the registered UE to access only the authorized IP cloud.

20 Claims, 10 Drawing Sheets

HOME NETWORKING USING LTE RADIO

CROSS-REFERENCE TO RELATED APPLICATIONS

This application is a divisional application of U.S. patent application Ser. No. 12/357,043, filed Jan. 21, 2009, now U.S. Pat. No. 8,132,256 and entitled "HOME NETWORKING USING LTE RADIO".

TECHNICAL FIELD

The subject innovation relates to wireless communications and, more particularly, employing femto cells to facilitate efficient management of multiple identities and billing relationships associated with home networks.

BACKGROUND

Technological advances have provided various sectors of society like government, industry, commerce and entertainment with access to networked information in order to increase operational and commercial efficiencies. In particular, manufacturers of consumer electronic devices (e.g. digital cameras, media players, digital picture frames, etc.) and/or home appliances (e.g. refrigerators, microwave ovens, air conditioning units, etc.) are moving towards creating smarter devices and/or appliances that can communicate over various networks. Such conventional systems can employ WiFi (Wireless Fidelity), Bluetooth® and/or existing wide area wireless technologies to communicate with devices and/or appliances. However, these conventional technologies are expensive to manage and/or implement and have not achieved commercial success.

With an expected increase in the size of the 4G (fourth generation) ecosystem, LTE (Long Term Evolution) radio communication systems can be incorporated in most any consumer devices and/or appliances. Moreover, as the volume of the 4G ecosystem grows, the price points for LTE radio communication systems can be significantly reduced and thus they can be easily incorporated in consumer devices and/or home appliances at a relatively small incremental cost. Specifically, these devices and/or appliances can access a core network and can have individual credentials for authentication with the core network. In this scenario, each manufacturer or vendor can possibly become a mobile virtual network operator (MVNO) and hence dilute ownership of the customer by an existing service provider/operator.

The conventional approaches proposed for LTE based consumer electronic devices and/or home appliances provide multiple identities (each per device) for a single user and thus multiple billing relationships. Thus, for example, in a home-networking scenario, a single homeowner can have a separate identity and bill for each LTE based device in the house. In another example of a factory, each machine in the factory can access the core network independently and have a unique identity and bill. From an end user perspective, this can be extremely frustrating as the number of LTE based devices for the user increases.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate employing a femto access point to connect multiple LTE-based devices located within the femto coverage area to a core network, such that a common bill can be provided for network traffic to/from the devices. Most often, the multiple devices can be associated with a common user, for example, an owner. In one aspect, charges for network usage by the multiple devices through the femto access point can be provided to the user in a comprehensive manner by employing a single femto id (identity) and/or credentials associated with the femto access point.

In accordance with another aspect of the system, a registration component can be employed to register LTE-based devices, appliances, and/or machines that are located within a femto coverage area. Further, the registration component can perform a security check to ensure that the LTE-based devices, appliances, and/or machines are authorized to connect to the femto access point by a user. In addition, a request receiving component receives a communication request to establish communication between the registered LTE-based devices, appliances, and/or machines and a core network.

Another aspect of the subject innovation comprises an authorization component that can be employed by the femto access point to perform authentication with a core network on behalf of the registered LTE-based devices, appliances, and/ or machines. Further, the core network can authorize the femto access point based on the femto id/credentials and a communication management component can facilitate communication of information by routing information from the registered devices, appliances, and/or machines to the core network and vice versa. In one aspect, the femto access point can determine an authorized IP (Internet Protocol) cloud associated with a registered UE and restrict communications from the registered UE to the authorized IP cloud.

Still another aspect of the system comprises a billing component that can be employed to monitor network usage by multiple devices, appliances, and/or machines registered with a femto access point in the network. In one aspect, the billing component can detect traffic to and/or from the femto access point, based in part on the femto id and/or credentials provided during network authentication and can accordingly update a billing database. The billing database can be accessed by an operator, service provider and/or user to determine network usage charges. Further, the billing component can employ various billing schemes for updating the billing database. In one example, the billing database can be updated based on network usage by each femto access point connected to the network. In another example, the billing database can be updated based on network usage by a content (or service) provider.

Yet another aspect of the disclosed subject matter relates to a method that can be employed to facilitate billing management associated with network usage by multiple UEs (user equipment) associated with a common consumer. Specifically, the method comprises receiving a request for communication from one or more of the multiple UEs that are registered and/or authorized to communicate via a femto access point. Further, authentication with a core network can be performed by employing a femto cell id/credentials to authorize communication. In addition, user credentials can also be employed to facilitate authorization to the core network. In one aspect, UEs can only be allowed to access authorized IP clouds. The method further comprises, routing information from the UE to the core network via a femto access point, by utilizing a femto id/credentials and similarly routing the information received from the core network to the appropriate UE. Accordingly, network traffic monitored on the core network can be associated with a single femto id/credentials for each of the multiple UEs and thus a single billing relationship can be generated based on the femto id/credentials.

Aspects, features, or advantages of the subject innovation can be exploited in substantially any wide area wireless communication technology that provides data connectivity based on individual user/device authentication and billing; e.g., Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA). Additionally, substantially all aspects of the subject innovation can be exploited in legacy telecommunication technologies.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
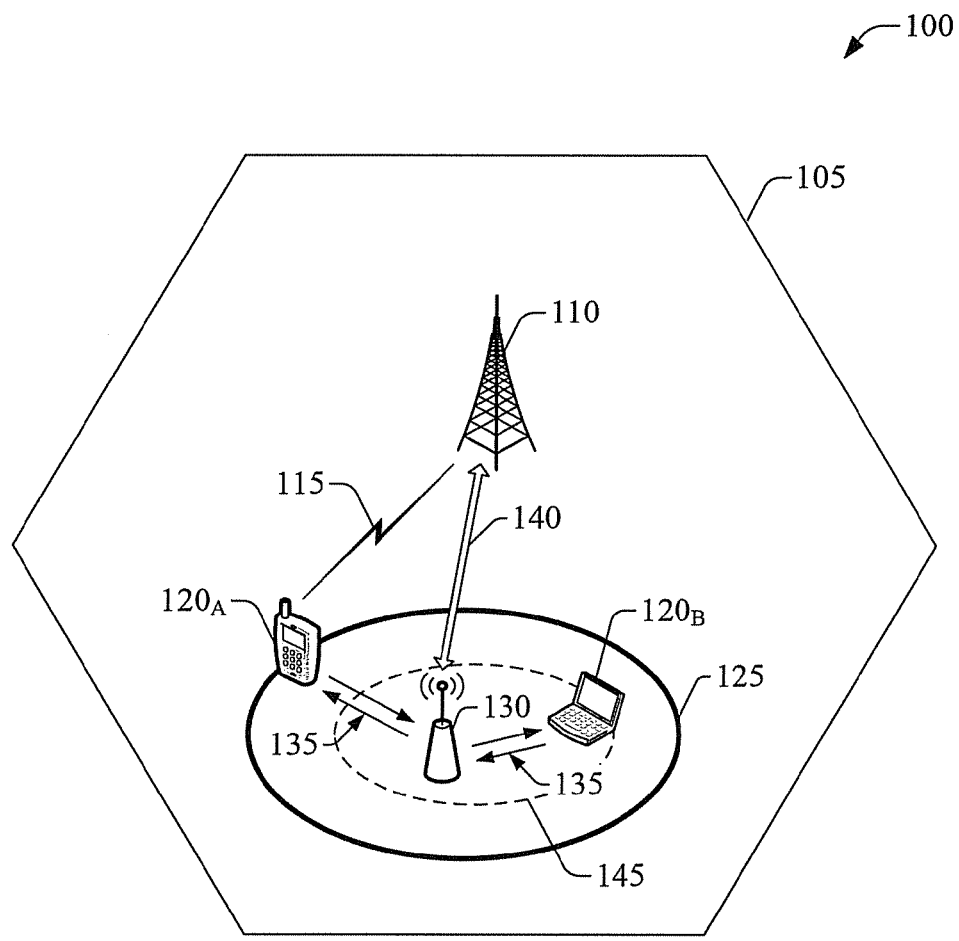
FIG. 1 illustrates a schematic deployment of a macro cell and a femto cell for wireless coverage in accordance with aspects of the disclosure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "appliance," "machine", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the term "LTE-based" employed herein refer to most any electronic device (and/or appliance) that utilizes LTE (Long Term Evolution) radio specifications for communication.

Furthermore, the terms "user," "subscriber," "customer," "consumer," "prosumer," "agent,", "owner" and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer. In addition, the terms "wireless network" and "network" are used interchangeable in the subject application, when context wherein the term is utilized warrants distinction for clarity purposes such distinction is made explicit. Likewise, the terms "femto cell access point" and "femto access point" are also utilized interchangeably.

Traditional approaches allow LTE-based devices and/or appliances to access a core network individually to interact with the internet. Thus, LTE-based devices and/or appliances owned by a single user can have separate identities and billing relationships. Multiple id (identity)/credential management and multiple billing relationships can get significantly complex as the number of devices and/or appliances increases and thus lead to user frustration.

Systems and/or methods are presented herein that can employ femto cells with 4G (Fourth Generation) technologies, such as LTE (Long Term Evolution) to facilitate authentication of consumer devices and/or appliances commonly owned by a single user. Thus, LTE-based devices and/or appliances can connect to the femto access point, such that, transport level billing can be associated with the femto cell for the single user. Femto cells—building-based wireless access points interfaced with a wired broadband network—are generally deployed to improve indoor wireless coverage, and to offload a mobile network operated by a wireless service provider (e.g. internet service provider). Improved indoor coverage includes stronger signal and improved reception (e.g., voice or sound), ease of session or call initiation, and session or call retention as well. Offloading a mobile network reduces operational and transport costs for the service provider since a lesser number of end users utilizes over-the-air radio resources (e.g., radio frequency channels), which are typically limited.

The systems and methods disclosed herein employ femto cells to facilitate authentication of the LTE radio based consumer devices and/or appliances in, for example, a home network, with a core network. In one aspect, by employing a femto cell, the consumer can be provided with better options for single billing for data communication of multiple LTE based devices/appliances associated with the consumer.

Referring initially to FIG. 1, there illustrated is a schematic wireless environment (e.g., a network) 100 in which a femto cell can exploit various aspects described in the subject specification. Illustrative communications environment 100 includes macro cell 105 and femto cell 125 that provide wireless coverage; LTE-based appliances and/or devices $120_B$, typically owned by a common consumer are deployed within femto cell coverage areas 125 and served through femto access points (APs) 130. In wireless environment 100, area 105 represents a coverage macro cell, which can be served by base station 110 associated with a core network. It should be appreciated that macro cell 105 is illustrated as a hexagon; however, macro cell(s) can adopt other geometries generally dictated by the deployment or floor plan, geographic areas to be covered, and so on. Macro coverage can generally be intended for outdoor locations for servicing mobile wireless devices, like UE (User Equipment) $120_A$, and such coverage can be achieved via an over-the-air wireless link 115. Specifically, it can be appreciated that although UE $120_A$ is depicted as a cellular phone in FIG. 1, UE $120_A$ can be most any LTE based electronic device (or appliance) that can communicate over the wireless link 115. The wireless link 115 comprises a downlink (DL) and an uplink (UL), and utilizes a predetermined band of the radio frequency (RF) spectrum. Within macro coverage cell 105, a femto cell 145, served by the femto access point 130, can be deployed. While in illustrative wireless environment 100 a single femto cell appears deployed within the macro cell, a substantive (e.g., $10^3$-$10^6$) number of femto AP 130 can be deployed. A femto cell typically covers an area 125 that can be determined, at least in part, by transmission power allocated to femto AP 130, path loss, shadowing, and so forth. It should be appreciated that while coverage area 125 and confined area 145 typically coincide, in certain deployment scenarios, coverage area 125 can include an outdoor portion (e.g., a parking lot, a patio deck, a recreation area such as a swimming pool and nearby space) while are 145 span an enclosed living space. Coverage area typically can be spanned by a coverage radius that ranges from 20 to 100 meters. Confined coverage area 145 can be generally associated with an indoor area, or a building, like a residential (e.g., a house, a condominium, an apartment complex) or small business (e.g., a library, a hospital, a retail store) setting which can span about 5000 sq. ft. Femto AP 130 typically services a few wireless devices (e.g., subscriber station $120_B$) within confined coverage area 145. In one aspect, multiple UEs (e.g. UE $120_B$), for example, owned by a common user can be associated with a common femto access point 130. It can be appreciated that, the UEs can be located within the coverage area of the femto access point 130 (e.g. UE $120_B$) or can be mobile UEs that can enter the coverage area of the femto access point 130 (e.g. UE $120_A$). Thus, in one example, the UEs can be authenticated by the femto access point 130 and data can be transferred through the femto access point 130, such that data transport level billing by the wireless service provider for the multiple authorized UEs can be associated with the common femto access point 130.

In an aspect, femto AP 130 can integrate seamlessly with substantially any packet switched (PS)-based and circuit switched (CS)-based network; for instance, femto AP 130 can integrate into an existing 4G network or 3GPP Core Network via conventional interfaces like Iu-CS, Iu-PS, Gi, Gn. Thus, operation with a 4G (or most any LTE radio) wireless device or user equipment can be substantially straightforward with femto AP 130 and seamless when handoff to macro cell, or vice versa, takes place.

Figure 2:
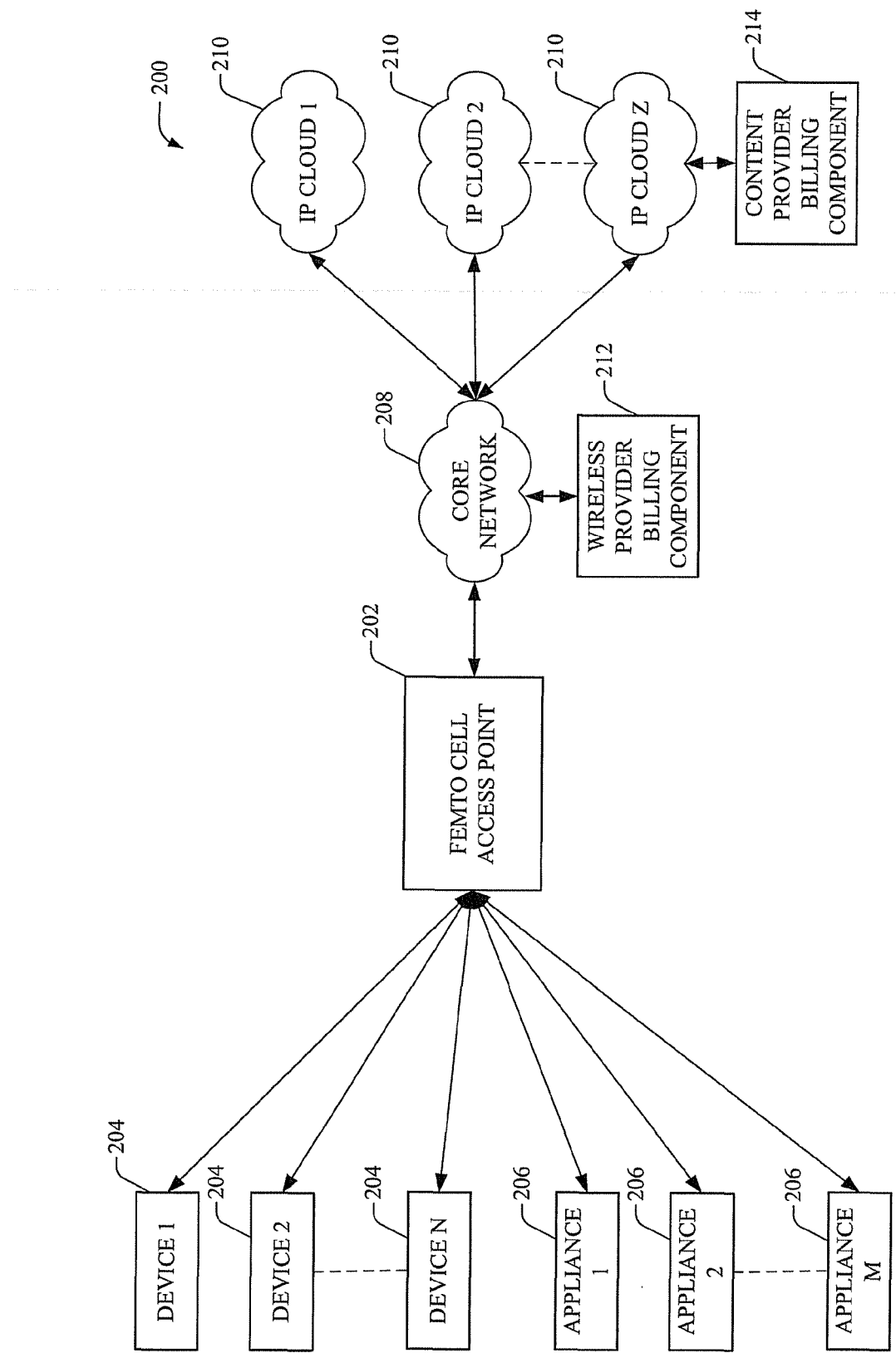
FIG. 2 illustrates an example system that can be employed to facilitate billing management associated with network usage for LTE-based devices and/or appliances, in accordance with an aspect of the disclosure.

Referring now to FIG. 2, there illustrated is an example system 200 that can be employed to facilitate billing management associated with network usage for LTE-based devices and/or appliances, in accordance with an aspect of the disclosure. It can be appreciated that the femto access point 202 can be substantially similar to the femto access point 130 and can include functionality, as more fully described herein, for example, with regard to system 100. In one example, the femto access point 202 can be employed as a home-networking hub, such that LTE based devices 204 and/or appliances 206 can connect to the femto access point 202. In one aspect, devices 204 and appliances 206 can include most any consumer electronic device or appliance that can connect to a radio access network, such as, but not limited to LTE networks.

In one aspect, the femto AP 202 can be employed to perform authentication with the core network 208 for the cellular network on behalf of the LTE based devices 204 and/or appliances 206. This can be achieved via a built in UE in femto AP 202 that can perform authentication and/or authorization for data traffic flowing to the core network 208 from devices 204 and/or appliances 206 attached to femto AP 202. Thus, in one example, the femto AP 202 can act as a proxy and can enable authentication and communication with the core network 208 on behalf of the LTE based devices 204 and/or appliances 206 by employing a femto id (identity)/credentials. In yet another example, the femto AP 202 can act as a broadband modem connected to core network of wireline or cable operator. In another example, the femto AP 202 can allow the LTE based devices 204 and/or appliances 206 to communicate with restricted IP (internet protocol) clouds via core network 208 based on registration information as described in detail infra.

The LTE based devices 204 can include, but are not limited to, most any consumer electronic devices, such as, a digital media player, a digital photo frame, a digital camera, a cellular phone, a personal computer, laptop, etc. Further, LTE based appliances 206 can include, but are not limited to, most any home or commercial appliance, such as, a microwave oven, a refrigerator, a cook top, a dishwasher, a washing machine, a dryer, heating unit etc. It can be appreciated that the LTE based devices 204 and/or appliances 206 can be mobile (e.g. media player), have limited mobility (e.g. oven) and/or be stationary (e.g. air conditioning unit). It can be appreciated that N devices 204 and M appliances 206 as depicted in the figure, can be connected to the femto access point 202 (where M, N can be any number from zero to infinity). Further, although the devices 204 and appliances 206 are described with respect to a home network, it can be appreciated that the disclose is not limited to home networking and can be employed to connect most any devices, appliances and/or machines within a confined area. For example, in a factory environment, multiple machines can be connected to a single femto access point 202. In another example, multiple devices/appliances within a small business, such as, a workshop, a library, a hospital, a retail store can be connected to a single femto access point 202, such that, the network traffic to any of the devices/appliances can be billed together.

According to an aspect, the devices 204 and/or appliances 206, can connect to the femto access point 202, for example, when they enter or are located within the coverage area of the femto access point 202. In one aspect, when a device 204 is mobile, for example, a navigation system on a car, the device 204 can connect to the femto access point 202 when it enters the coverage area (e.g. when the car enters or is parked in the garage attached to the house, located in the femto coverage area). The femto access point 202 can perform authentication with a core network by employing a femto id/credentials to facilitate communication between the core network and the devices 204 and/or appliances 206. According to an aspect, the femto access point 202 can determine an IP cloud that a particular device 204 and/or appliance 206 is authorized to communicate with. As an example, the femto access point 202 can determine authorization based in part on an IP address associated with the device 204 or appliance 206 during a registration process. Further, the femto access point 202 can route communication between the particular device 204 or appliance 206, and an authorized IP cloud 210. Thus, in one aspect, the femto access point 202 can provide restricted access to/from device 204 or appliance 206.

In one embodiment, the femto access point 202 can store user credentials that can be utilized to facilitate authorization for communication to/from each of the devices 204 and/or appliances 206. Typically, user credentials can include a username and/or password. However, it can be appreciated that most any authorization technique and user credentials can be employed, such as but not limited to, biometrics, pin numbers, etc. Additionally or alternately, the femto access point 202 can include a SIM (Subscriber identity Module) or USIM (Universal Subscriber Identity Module). The SIM can include an International Mobile Subscriber Identity (IMSI), which is a unique identifier of a subscriber (e.g. femto access point 202) and can be employed to facilitate authorization and/or billing.

In one aspect of the subject disclosure, an IP cloud can be associated with portal (not shown) managed by a vendor and/or manufacturer of a device 204 and/or appliance 206. As an example, the device 204 can send a communication request to the femto access point 202 to initiate communication, for example with the IP cloud 210. The femto access point 202 can determine if the device 204 is authorized to communicate with the IP cloud 210. If determined that the device is authorized, the femto access point 202 can route the communication request to the IP cloud 210 by employing a femto cell id/credentials. If the femto access point 202 determines that the device 204 is not authorized to access the requested IP cloud 210, the device can be notified and/or the request can be denied and/or blocked.

According to an additional aspect, it can be appreciated that the core network is not limited to a cellular network and can be most any communication network, such as, but not limited to, a broadband core network. In this scenario, the LTE-based devices 204 and/or appliances 206 attached to femto access point 202, once they are authenticated by femto AP 202, can be connected to the broadband core for communication. The broadband core can typically be a core network for DSL/broadband.

In an embodiment, a wireless provider billing component 212 can be employed to manage transport level billing relationships for each femto access point 202 in the core network 208. In particular, the wireless provider billing component 212 can monitor traffic to and/or from the femto access point 202 and accordingly update a billing database (not shown). The billing database can be an internal or external database that can be remotely located. Further, the billing database can be a relational database, object database, multidimensional database, or the like. The wireless provider billing component 212 can employ various methods to manage transport level billing. In one example, the wireless provider billing component 212 can create customer accounts based on femto access point ids. Thus, a customer that owns multiple devices, connected to a single femto access point 202 can receive a comprehensive bill for network usage by the multiple devices. In another example, the wireless provider billing component 212 can create vendor (and/or manufacturer) accounts based in part on the communication to/from the IP cloud 210 associated with the vendor. In one aspect, the wireless provider billing component 212 can employ billing rates be based on number of devices connected and/or amount of network usage.

Referring back to FIG. 2, a content provider billing component 214 can also be provided by a content and/or service provider associated with each IP cloud 210. It can be appreciated that although only three IP clouds 210 are illustrated in FIG. 2, Z IP clouds can be connected with the core network 208, wherein Z is most any number from zero to infinity. In an aspect, the content provider billing component 214 can be employed to facilitate most any billing policy by a vendor (and/or manufacturer). As an example, the content provider billing component 214 can bill customers based on type and/or amount of content and/or services provided. According to an aspect, the wireless provider billing component 212 and the content provider billing component 214 can be correlated by employing most any business model.

Consider an example home-networking scenario, wherein a user can employ a femto access point 202 as a home-networking hub to connect multiple LTE based appliances 206 and/or devices 204 located in the home. In one example, a refrigerator 206 can be enabled to communicate over LTE networks and can connect to the femto access point 202. Further, the refrigerator 206 can diagnose a problem and initiate a communication with technical support provided by a manufacturer through the femto access point 202. Thus, the femto access point 202 can determine that the refrigerator is authorized to communicate with an IP cloud associated with the manufacturer and can route the communication request to the IP cloud by utilizing an id (identity) and/or credentials associated with the femto access point 202. When communication is authorized based on the credentials/id associated with the femto access point 202, data can be transferred through the femto access point 202, such that the refrigerator 206 can receive updates, for example, software to repair the diagnosed problem, from the manufacturer over the core network. Typically, the network traffic to/from the femto access point 202 can be monitored by the wireless provider billing component 212. Moreover, the wireless provider billing component 212 can update a billing database based on an amount of information (e.g. data, audio, video, etc.) transferred between the core network and the femto access point 202. Although the above example indicates that communication is initiated by the appliance 206, it can be appreciated that communication can also be initiated by a manufacturer, vendor and/or authorized third party. For example, the manufacturer can initiate communication with the femto access point 202 to transfer, for example, updates and/or new versions of software, etc. to a device 204 and/or appliance 206 that is registered with the femto access point 202 and authorized to communicate with the manufacturer.

Figure 3:
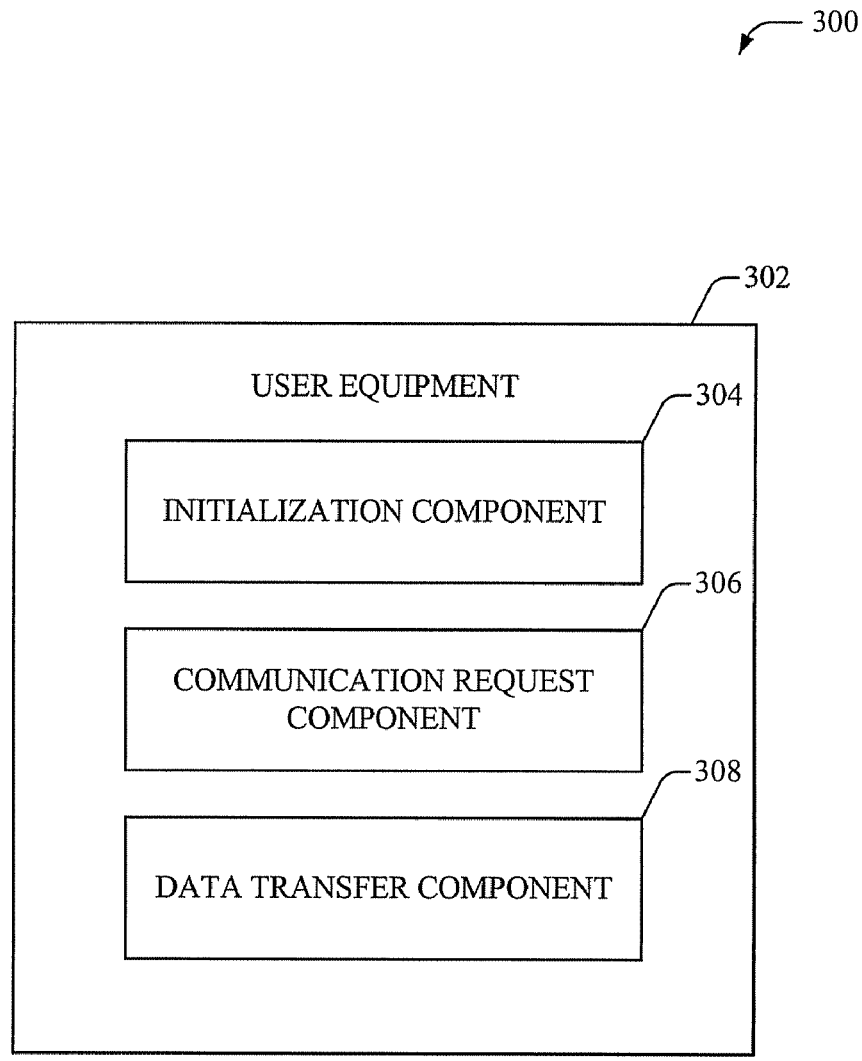
FIG. 3 illustrates an example system that can be employed by a UE (user equipment) to communicate with a WWAN (wireless wide area network) via a femto access point, according to an aspect of the subject specification.

Referring now to FIG. 3, there illustrated is an example system 300 that can be employed by a UE (user equipment) 302 to communicate over the internet via a femto access point, according to an aspect of the subject specification. The UE 302 can be most any LTE based device, appliance and/or machine employed by a user, for example, a heating cooling unit, a gaming module, a television, a projector, refrigerator, microwave oven, personal computer, etc. Moreover, the UE 302 can instead utilize various technologies for terrestrial wireless communication, for example, an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), 3GPP Long Term Evolution (LTE), Wideband Code Division Multiple Access (W-CDMA), or Ultra-broadband Mobility (UMB); advanced 3G such as Worldwide Interoperability for Microwave Access (WiMax); or a fourth generation (4G) technology such as for example Long Term Evolution (LTE) Advanced. Additionally, a UE 302 can consume satellite-based traffic such as data originated from GPS, GLONNAS, or Galileo systems, conveyed through a deep-space link (not shown).

According to an aspect, the UE 302 authenticates itself, connects to a femto access point (e.g. 202 in FIG. 1) and communicates with the outside world through the femto access point. The authorization for the UE 302 to communicate over the network in this case is provided by the femto access point. UE 302 can include an initialization component 304 that is employed to register the UE 302 with a femto access point. In particular, the initialization component 304 is employed to determine if the UE 302 is located within a femto cell coverage area and can be authenticated with the femto access point. Moreover, the initialization component 304 can also be employed to facilitate UE 302 authentication with the core network based on access point credentials associated with core network access.

In accordance with an embodiment, UE 302 can further include a communication request component 306 that can be employed to send a request to the femto access point to access the network. In particular, the communication request component 306 can send a request to the femto access point that indicates that the UE 302 would like to initiate a communication with the network, for example, to access the internet, access a vendor website, contact a customer service portal, etc. The femto access point can then handle network authorization on behalf of the UE 302 by employing a femto cell id/credentials. In one aspect, the femto cell can restrict UE communication to specific IP clouds that are authorized. In addition, a data transfer component 308 can be employed to transfer data to the femto access point and/or receive data from the femto access point. The data can include, text, audio, video, streaming media, or the like.

For example, the UE 302 can be an appliance, such as a washing machine located in a user's home. Typically, the initialization component 304 can be employed to register the washing machine with a femto access point that acts as a network hub for the user's home network. In one aspect, the washing machine can access an IP cloud, for example, to report status information or report a diagnosed problem to a manufacturer, by sending a request to the femto access point (e.g. by employing the communication request component 306) to initiate communication. The femto access point routes the request from the UE 302 to an authorized IP cloud by employing a femto id and/or user credentials stored at the femto access point. Further, the data transfer component 308 can determine when the femto access point establishes a connection and accordingly transmits and/or receives information to/from the femto access point.

Figure 4:
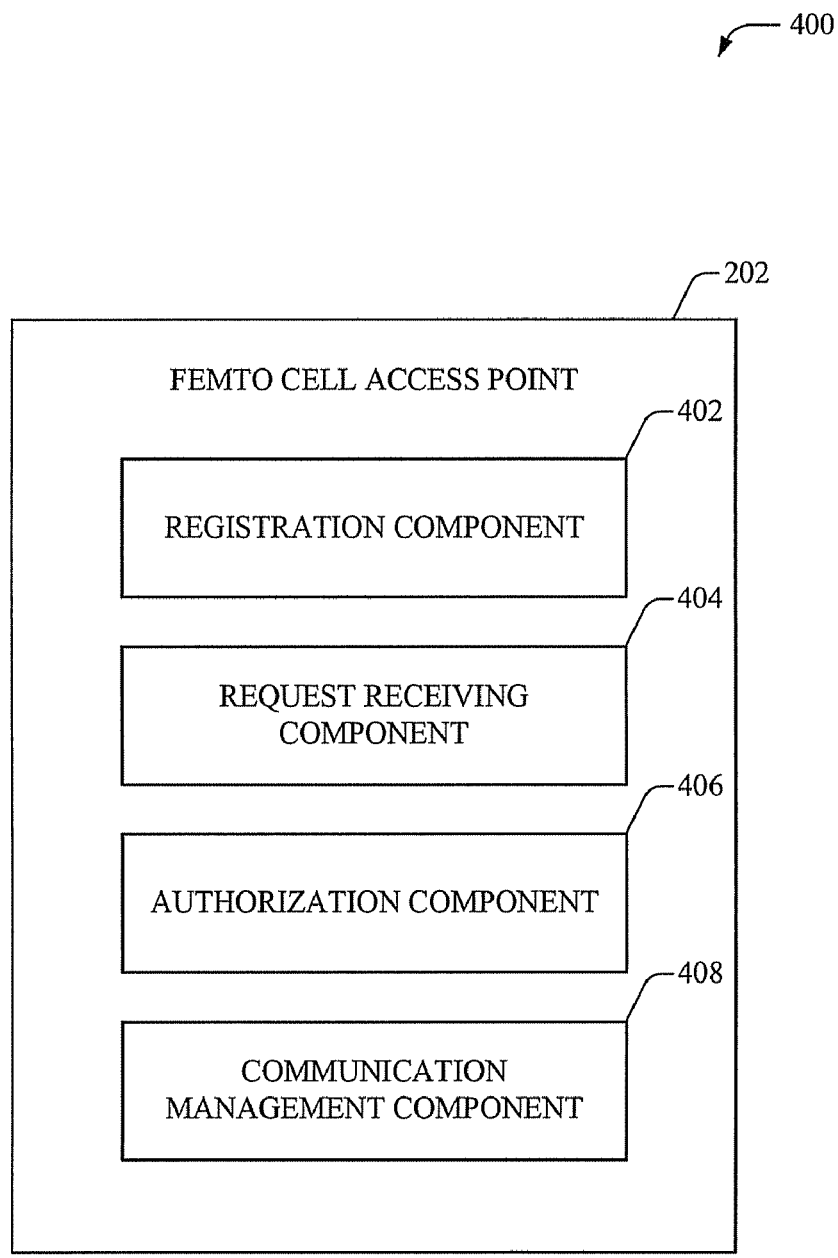
FIG. 4 illustrates an example system that can be employed to facilitate single billing relationships for multiple devices connected to a femto access point, in accordance with the subject disclosure.

FIG. 4 illustrates an example system 400 that can be employed to facilitate single billing relationships for multiple devices connected to a femto access point 202, in accordance with the subject disclosure. According to an aspect, the femto access point 202 can be utilized to connect multiple devices located within the femto coverage area to a core network, such that a common bill can be provided for network traffic to/from the devices. Most often, the multiple devices can be associated with a common user, for example, an owner, subscriber, consumer, prosumer, etc. Further, it can be appreciated that the femto access point 202 can include features and functionality, as more fully described herein, for example, with regard to system 100 and 200.

The femto access point 202 includes a registration component 402 that registers LTE-based devices (and/or appliances, machines, etc.) that are located within a femto coverage area. Moreover, the femto access point 202 is employed as a networking hub that for LTE-based devices, appliances, and/or machines, for example, in a home, office, warehouse, school, hospital, retail store, restaurant, theatre, etc.

Further, the registration component 402 also employs one or more authentication techniques to determine if the device attempting to connect to the femto access point 202 is authorized by the user. Typically, multiple devices associated with a common user can be allowed to connect to the femto access point 202, such that, the common user can be provided with a single bill for network usage by the multiple devices. Accordingly, the user can provide a list of devices that can be authorized to connect to the femto access point 202 and access the core network through the femto access point 202. The registration component 402 can utilize information based in part on the list and/or most any other security technique to prevent unauthorized access to the femto access point 202. When the registration (e.g. by the registration component 402) is successful, the device can be allowed to communicate through the femto access point 202.

According to an aspect, a request receiving component 404 can be employed to receive a communication request sent by one of the multiple registered devices connected to the femto access point 202. In one aspect, the request receiving component 404 can also receive a request from a portal and/or device on the core network and/or IP cloud to establish communication with at least one of the multiple registered devices connected to the femto access point 202. On receiving a request, for example, from a registered device, an authorization component 406 can be employed to perform authentication with the core network. Specifically, the authorization component 406 can employ a femto id and/or user credentials associated with the femto access point 202 to perform authentication. In one aspect, the femto id/credentials provided by the authorization component 406 can be utilized by the service provider to facilitate a billing process for network usage. Thus, each device associated with a common user does not have to independently connect to and/or be authenticated with the core network. In another aspect, the authorization component 406 can be employed to restrict connection of a particular device to one or more specific IP clouds. Thus, the authorization component 406 can determine an IP cloud that the device is authorized to communicate with. As an example, the authorization to access an IP cloud can be based in part on an IP address given to a device during registration.

Once the femto access point 202 has been authenticated with the core network and/or an authorized IP cloud, for example, by the authorization component 406, a communication management component 408 can facilitate data transfer between the device and the core network and/or authorized IP cloud. In one aspect, the communication management component 408 can facilitate voice and data routing, and/or control signaling from the device to the core network and vice versa. Moreover, an external device and/or portal on the core network and/or authorized IP cloud that wants to communicate with a device connected to the femto access point 202, in one aspect, can establish communication with the femto access point 202 associated with the device based in part on a determined femto id. The communication management component 408 can receive the communication from the external device and/or portal and route the communication to the appropriate device based in part on an analysis of a received communication request. In another aspect, the femto access point 202 can receive a communication request from a registered device and the communication management component 408 can route the communication received from the device to an appropriate external device and/or portal or IP cloud.

FIGS. 5-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
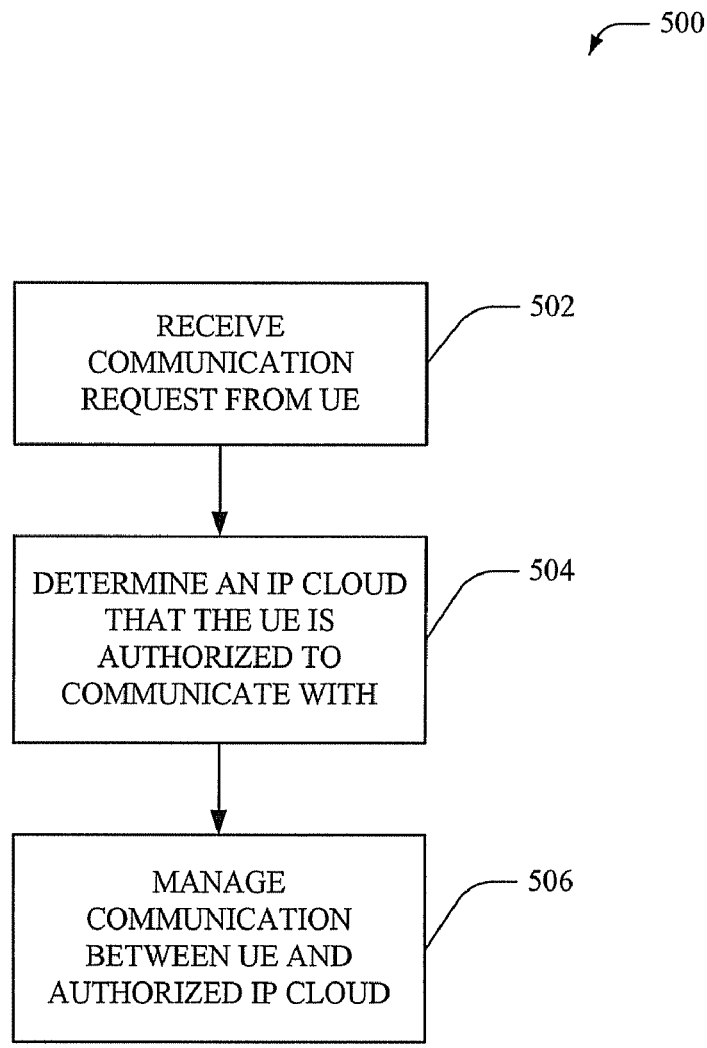
FIG. 5 illustrates an example methodology that can be employed to facilitate restricted communication of UEs with a core network in accordance with an aspect of the subject disclosure.

Referring now to FIG. 5, illustrated is an example methodology 500 that can be employed to facilitate restricted communication of UEs with a core network in accordance with an aspect of the subject disclosure. Typically, the UEs can include most any LTE-based consumer electronic device, such as, but not limited to, media players, digital cameras, media recorders, laptops, cell phone, PDAs (personal digital assistants), personal computers, printers, scanners, digital photo frames, GPS module, gaming module, etc. Further, the UEs can also include most any LTE-based appliances that can employed, for example, in a home, office, building, retail store, restaurant, hotel, factory, warehouse, etc., such as, but not limited to, heating or cooling unit, lighting unit, washing machine, dryer, dishwasher, refrigerator, oven, stove, etc.

At 502, a request for communication can be received from the UE. In one aspect, the UE can be previously registered and/or authorized to send communication requests. The request can be, for example, sent by a UE to communicate with an IP cloud. At 504, an IP cloud that the UE is authorized to communicate with can be determined. As an example, the authorized IP cloud can be determined based on an analysis of an IP address associated with the UE that can be assigned to the UE during a registration process. In one aspect, communication to/from the UE can be restricted to the authorized IP cloud. Additionally, communication requests to/from non authorized IP clouds can be denied and/or blocked. In another aspect, user credentials can also be employed to facilitate authorization to a core network. At 506, communication between the UE and the authorized IP cloud can be managed. In one aspect, the information from the UE can be routed to the authorized IP cloud (e.g. by employing a femto cell id/credentials) and the information from the authorized IP cloud can be received and routed to the appropriate UE.

Figure 6:
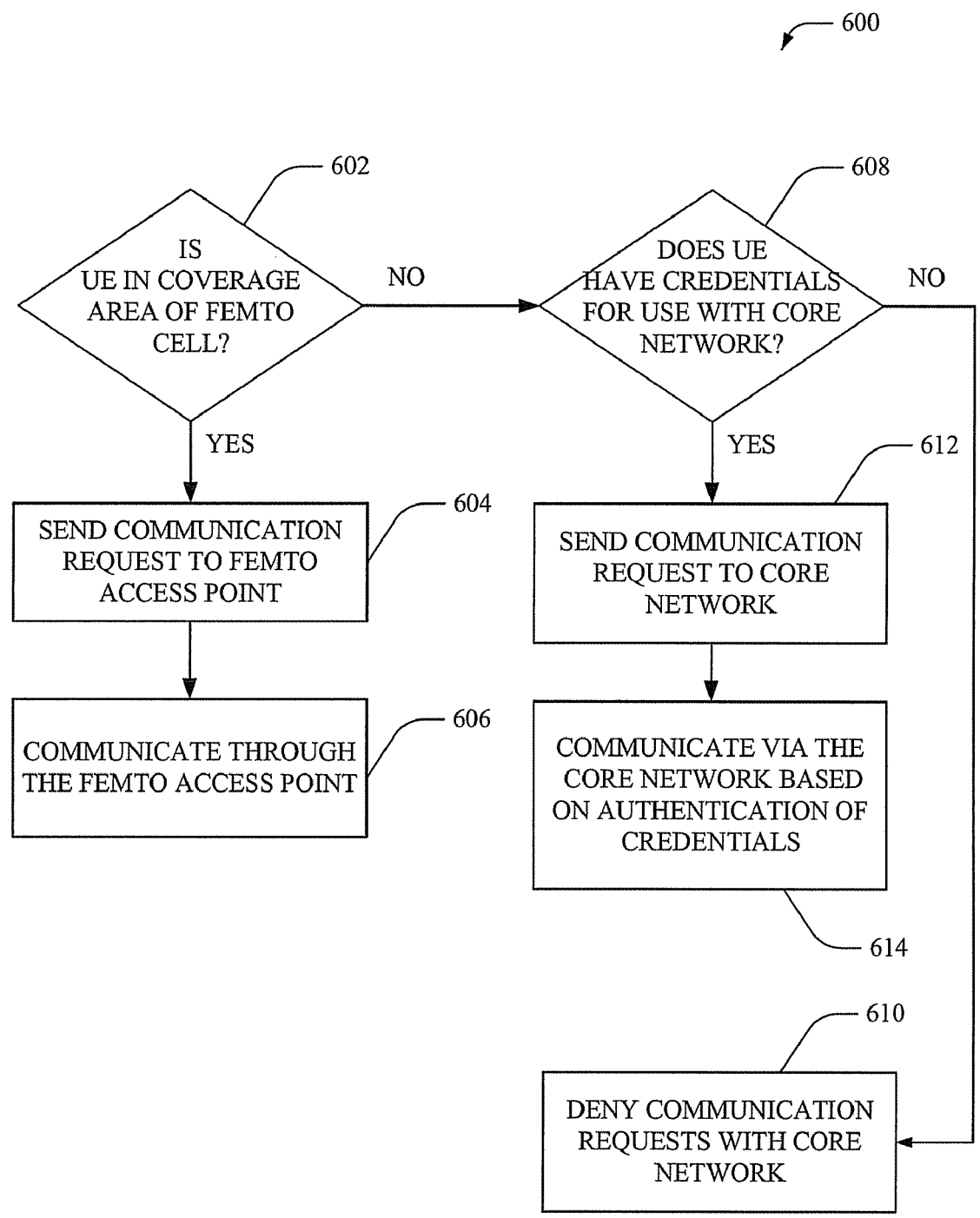
FIG. 6 illustrates example methodology that can be employed by an UE to facilitate communication in accordance with the subject innovation.

FIG. 6 illustrates an example methodology 600 that can be employed by an UE to facilitate communication in accordance with the subject innovation. In one aspect, the UE can be most any LTE-based device, appliance and/or machine that can connect to a wireless wide area network (WWAN) (e.g. employing 2G/3G/3.5G/4G technology). The UE can typically initiate communication, for example, to access the Internet over a core network. At 602, it can be determined whether the UE is located within a coverage area of a femto cell. If determined that the UE is within the coverage area, at 604, a communication request is sent to the femto access point. Typically, the femto access point can verify the authorization of the UE and/or the request. Further, the femto access point can perform authentication with the core network on behalf of the UE and can route the communication request over the core network by employing a femto id and/or user credentials stored at the femto access point. Additionally, the femto access point can establish a communication link to the core network. In another aspect, the femto can restrict UE communication to an authorized IP cloud. At 606, communication can be performed though the femto access point.

Alternately, if at 602, it is determined that the UE is not within a femto coverage area, at 608, it can be determined if the UE has credentials for authorization with the core network. If the UE does not have credentials for authorization, communication with the core network can be denied as shown at 610 and/or communication requests from the UE can be rejected and/or blocked. Alternately, when determined that the UE policies allow and the UE has authorization credentials for direct authentication with the core network (e.g. cellular network), a communication request can be sent to the core network, as shown at 612. Further, at 614, communication can be performed directly via the core network.

Figure 7:
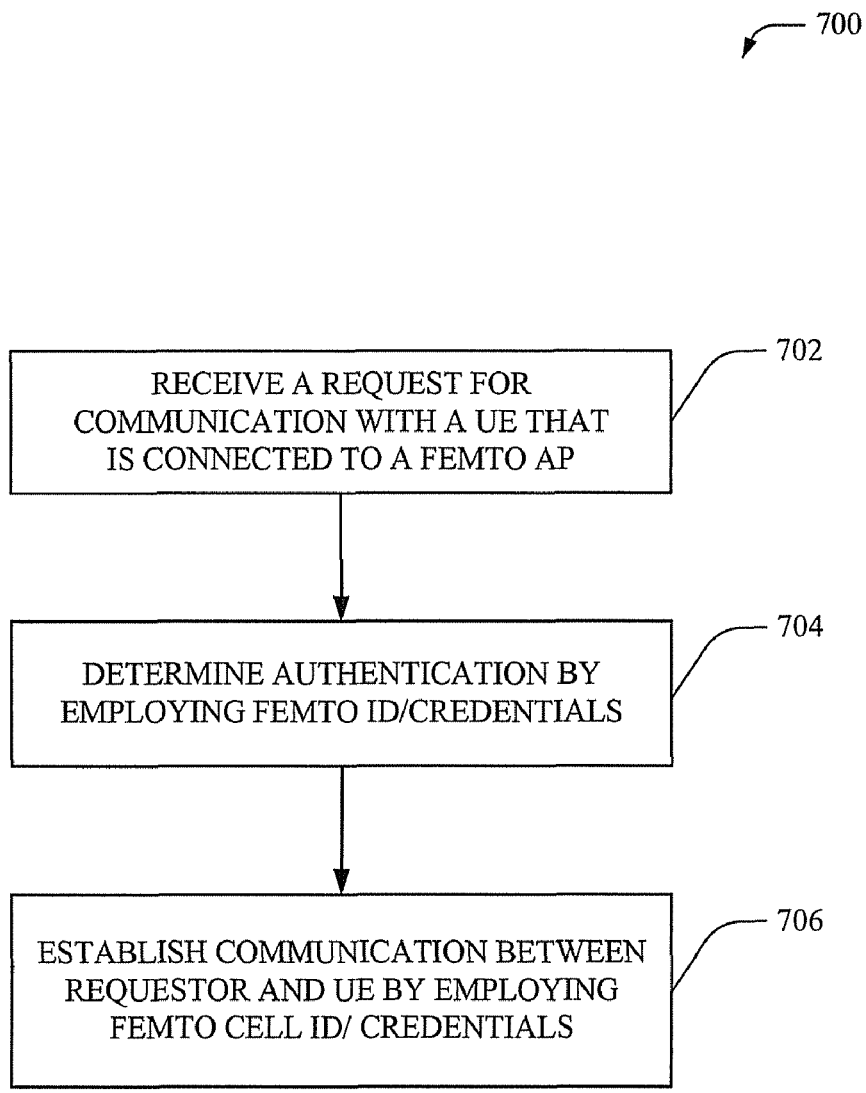
FIG. 7 illustrates an example methodology that can be employed to manage communication between multiple UEs (user equipment) and a core network, according to an aspect of the subject innovation.

Referring now to FIG. 7, there illustrated is an example methodology 700 that can be employed to manage communication between multiple UEs and a core network, according to an aspect of the subject innovation. Moreover, at 702, a request can be received, for example at a femto AP, from a device connected to the core network to communicate with a UE (e.g. an LTE-based device or appliance), connected to the femto AP. In an aspect, the request can be from a vendor portal and/or system connected to the core network. For example, a vendor can communicate with an appliance to provide an annual update with the latest software version. At 704, a femto id (identity)/credentials associated with a femto access point, which the UE can be connected through, can be employed for authentication with the core network. At 708, communication can be established between the requestor and the UE by employing a femto id/credentials. In particular, information can be received from the requestor and routed to the appropriate UE. According to an aspect, a billing system associated with core network usage, can monitor the communication and update a billing database based on the femto id/credentials. Accordingly, the billing database can maintain a single billing relationship based on the single femto id/credentials.

Figure 8:
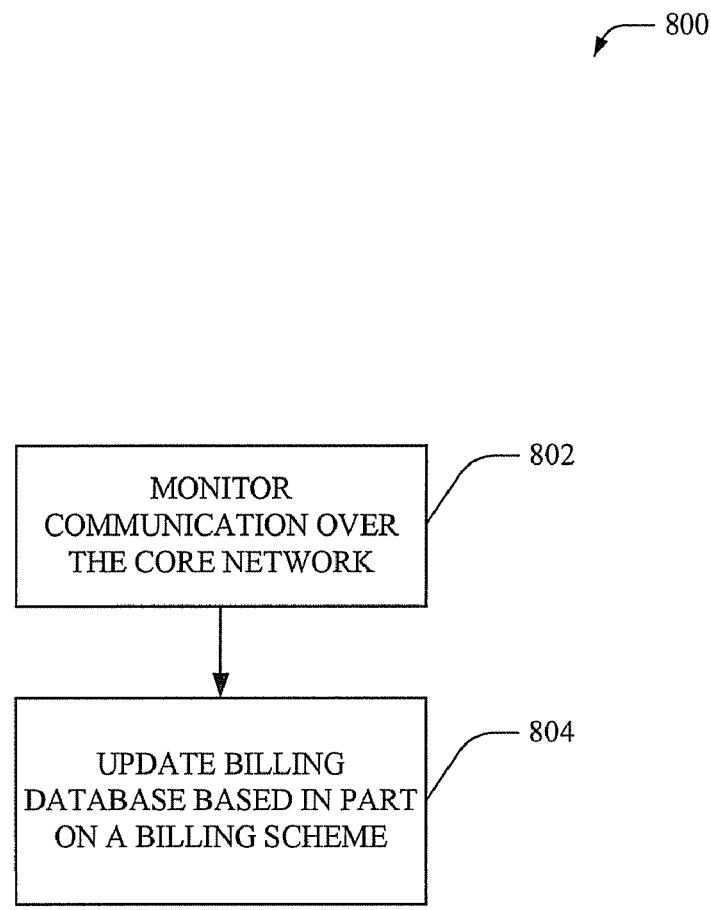
FIG. 8 illustrates an example methodology that can be employed to determine a billing relationship associated with network usage in accordance with the subject innovation.

Referring to FIG. 8, illustrated is an example methodology 800 that can be employed to determine a billing relationship associated with network usage in accordance with the subject innovation. In one aspect, a billing scheme can be provided by, for example, a wireless service provider (e.g. ISP). In one example scheme, a user (e.g. associated with a femto cell) can be charged based in part on the amount of traffic detected on the network that is employed by the user. According to an aspect of the subject specification, the user can typically be associated with multiple devices that can access the network through a femto access point. Moreover, the service provider can generate a comprehensive bill to charge the user for network usage by the multiple devices by employing a femto id/credentials. In another example scheme, a content (or service) provider can be charged based in part on the amount of traffic detected on the network that is employed by the content provider to supply information to and/or receive information from multiple users.

At 802, communication over the core network can be monitored. At 804, a billing database can be updated based in part on the billing scheme employed. In one aspect, the network usage by multiple devices through a femto access point can be determined based in part on the femto id and/or/credentials that are employed by the femto access point during network authentication.

Figure 9:
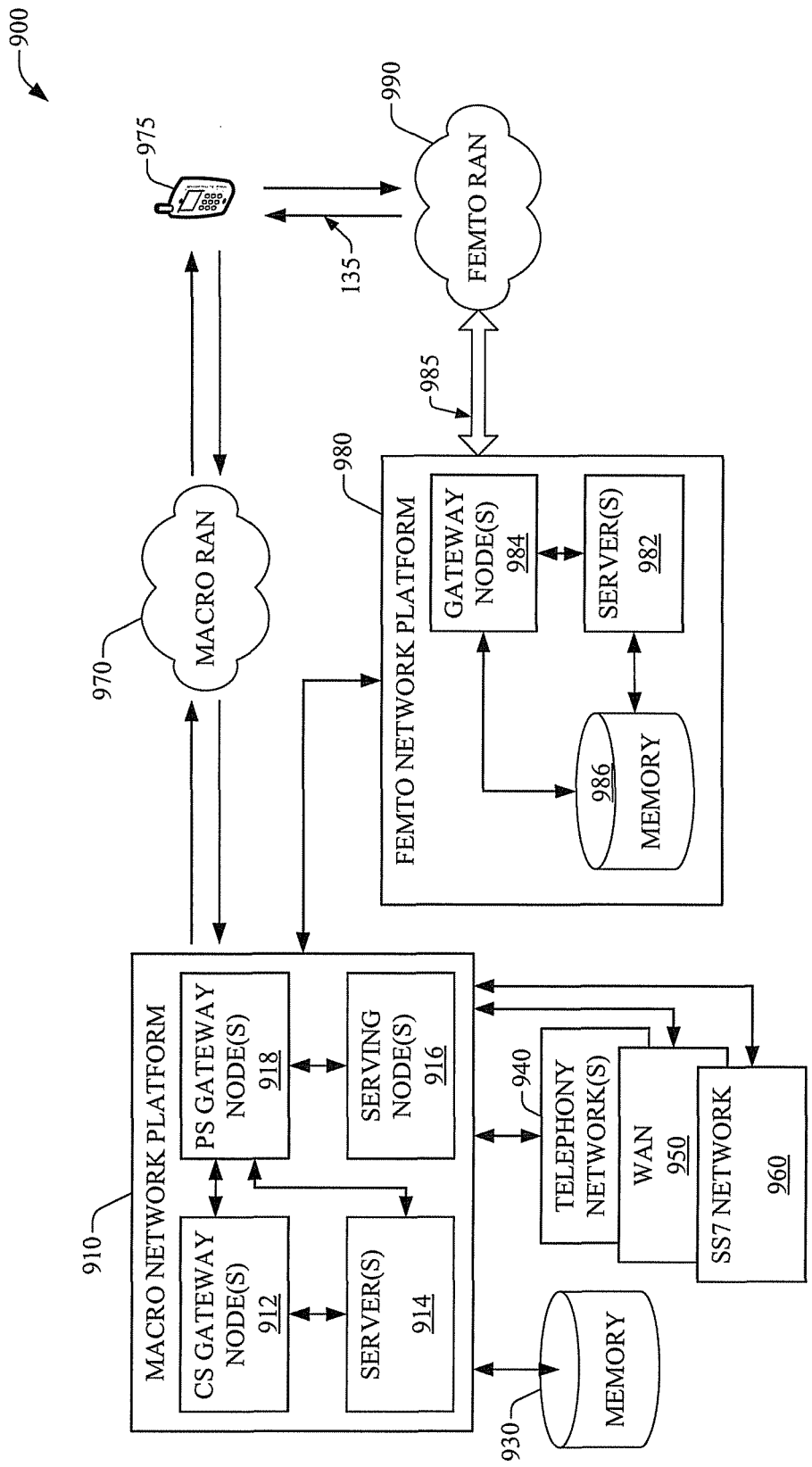
FIG. 9 illustrates an example wireless communication environment with associated components for operation of a femto cell in accordance with the subject specification.
Figure 10:
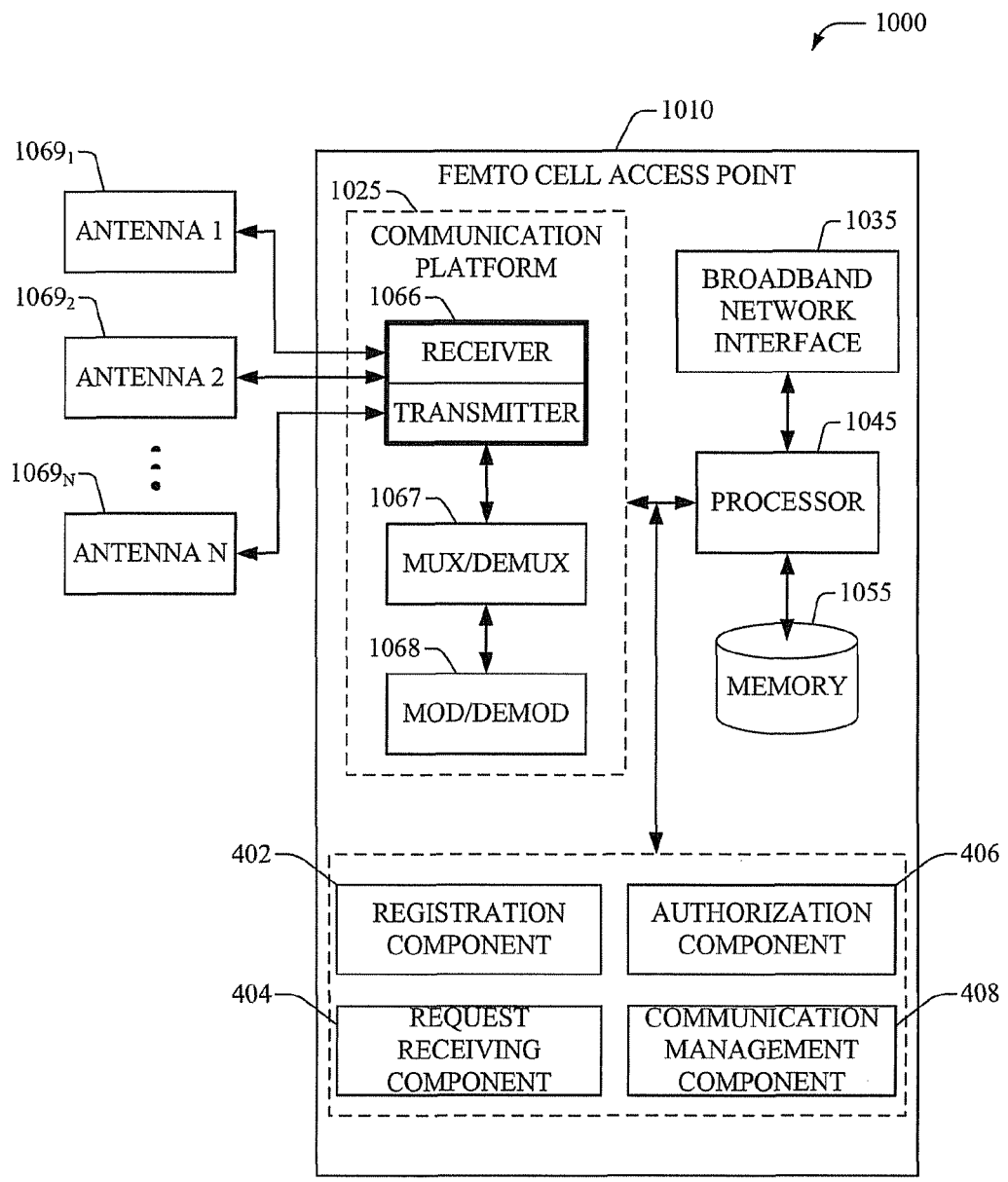
FIG. 10 illustrates an example embodiment of a femto access point that can facilitate providing single billing relationships for multiple UEs associated with a common user, according to the subject disclosure.

To provide further context for various aspects of the subject specification, FIGS. 9 and 10 illustrate, respectively, an example wireless communication environment 900, with associated components for operation of a femto cell, and a block diagram of an example embodiment 1000 of a femto access point that can facilitate providing single billing relationships for multiple UEs associated with a common user, in accordance with aspects described herein.

Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 via backhaul pipe(s) 985, wherein backhaul pipe(s) are substantially the same a backhaul link 140. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 105, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution, Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

With respect to FIG. 10, in example embodiment 1000, femto cell AP 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 includes a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1010 also includes a processor 1045 configured to confer functionality, at least partially, to substantially any electronic component in the femto access point 1010, in accordance with aspects of the subject innovation. In particular, processor 1045 can facilitate femto AP 1010 to implement configuration instructions received through communication platform 1025, which can include storing data in memory 1055. In addition, processor 1045 facilitates femto AP 1010 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by femto AP; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; femto AP address(es) or geographical indicator(s); access lists (e.g., white lists); license(s) for utilization of add-features for femto AP 1010, and so forth.

In embodiment 1000, processor 1045 is coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources . . . ; not shown) that support femto access point 1010. Further, it can be appreciated that the registration component 402, request receiving component 404, authorization component 406 and communication management component 408 can include features and functionality, as more fully described herein, for example, with regard to system 400.

It is to be noted that aspects, features, or advantages of the subject innovation described in the subject specification can be exploited in substantially any wireless communication technology. For instance, 4G, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

In addition, it is to be noted that the various aspects disclosed in the subject specification can also be implemented through (i) program modules stored in a computer-readable storage medium or memory (e.g., memory 986 or memory 1055) and executed by a processor (e.g., processor 1045), or (ii) other combination(s) of hardware and software, or hardware and firmware.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores computer-executable instructions; and
a processor, communicatively coupled to the memory, that facilitates execution of the computer-executable instructions to:
facilitate a registration of a user equipment with a femto access point device in response to a determination that the user equipment is within a coverage area associated with the femto access point device; and
facilitate an establishment of a communication between the user equipment and a mobility network device via the femto access point device, based in part on an authentication of the user equipment with the mobility network device based on credential data assigned to the femto access point device.

2. The system of claim 1, wherein the processor further facilitates the execution of the computer-executable instructions to facilitate a transfer of a request to initiate the communication via the femto access point device.

3. The system of claim 1, wherein the authentication is a first authentication, the credential data is first credential data, the determination is a first determination, and wherein the processor further facilitates the execution of the computer-executable instructions to facilitate a second authentication of the user equipment with the mobility network device, based in part on second credential data that is received from a network device associated with a service provider, in response to a second determination that the user equipment is outside the coverage area.

4. The system of claim 1, wherein the processor further facilitates the execution of the computer-executable instructions to facilitate a transmission of registration data to the femto access point device, and wherein the registration data is utilizable to identify an internet protocol network that the user equipment is authorized to access.

5. The system of claim 4, wherein the processor further facilitates the execution of the computer-executable instructions to facilitate a transfer of communication data between the user equipment and an internet protocol network device of the internet protocol network via the femto access point device, based in part on the credential data assigned to the femto access point device.

6. The system of claim 4, wherein the communication is a first communication and the registration data is utilized to restrict a second communication associated with the user equipment to an internet protocol network device of the internet protocol network.

7. The system of claim 4, wherein the registration data is utilized to authenticate the user equipment with the femto access point device.

8. The system of claim 1, wherein the credential data includes identifier data indicative of an identifier assigned to the femto access point device.

9. The system of claim 1, wherein the user equipment includes a long term evolution-based appliance.

10. A method, comprising:
facilitating, by a system comprising a processor, a registration of a user equipment with a femto access point device; and
facilitating, by the system, an establishment of a communication between a mobility network device and the user equipment via the femto access point device, subsequent to an authentication of the user equipment with the mobility network device based in part on femto identity data indicative of an identifier of the femto access point device.

11. The method of claim 10, further comprising:
determining, by the system, that the user equipment is within a coverage area associated with the femto access point device, wherein the facilitating the registration of the user equipment is in response to the determining.

12. The method of claim 10, further comprising:
directing, by the system, registration data associated with the user equipment to the femto access point device to facilitate the registration, wherein the registration data is utilized to determine devices of an internet protocol network that the user equipment is authorized to access.

13. The method of claim 10, further comprising:
determining, by the system, user credential data associated with the user equipment.

14. The method of claim 13, further comprising:
authenticating, by the system, the user equipment with the mobility network device via a macro access point device, based in part on the user credential data, in response to the user equipment being determined to be outside a coverage area associated with the femto access point device.

15. The method of claim 14, wherein the communication is a first communication and the method further comprises:
subsequent to the authenticating, facilitating, by the system, an establishment of a second communication between the mobility network device and the user equipment, in response to the user equipment being determined to be outside the coverage area associated with the femto access point device.

16. A non-transitory computer readable storage medium comprising computer-executable instructions that, in response to execution, cause a system comprising a processor to perform operations, comprising:
directing, to a femto access point device, registration data to facilitate authorizing a user equipment to access the femto access point device; and
facilitating establishment of a communication between a mobility network device and the user equipment via the femto access point device, based on an authentication of the user equipment with the mobility network device that is performed by utilizing credential data assigned to the femto access point device.

17. The non-transitory computer readable storage medium of claim 16, wherein the registration data includes an internet protocol address of the user equipment.

18. The non-transitory computer readable storage medium of claim 16, wherein the authorizing is facilitated by employing an access control list associated with the femto access point device.

19. The non-transitory computer readable storage medium of claim 16, wherein the registration data is employed to determine a set of internet protocol network devices of an internet protocol network that the user equipment is authorized to access.

20. The non-transitory computer readable storage medium of claim 19, wherein the operations further comprise:
subsequent to the authorizing, facilitating a transmission of a request to establish the communication.

* * * * *